US009925700B2

(12) United States Patent
Ozawa et al.

(10) Patent No.: US 9,925,700 B2
(45) Date of Patent: Mar. 27, 2018

(54) METHOD AND APPARATUS OF MANUFACTURING MOLDING MATERIAL, AND METHOD OF MANUFACTURING RESIN GEAR

(71) Applicant: HITACHI CHEMICAL COMPANY, LTD., Tokyo (JP)

(72) Inventors: Masaya Ozawa, Tokyo (JP); Masao Sugiyama, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 14/916,527

(22) PCT Filed: Dec. 27, 2013

(86) PCT No.: PCT/JP2013/085129
§ 371 (c)(1),
(2) Date: Mar. 3, 2016

(87) PCT Pub. No.: WO2015/097866
PCT Pub. Date: Jul. 2, 2015

(65) Prior Publication Data
US 2016/0288379 A1    Oct. 6, 2016

(51) Int. Cl.
*B28B 1/26*    (2006.01)
*B28B 19/00*    (2006.01)
(Continued)

(52) U.S. Cl.
CPC ............ *B29C 43/361* (2013.01); *B29B 11/12* (2013.01); *B29B 11/16* (2013.01); *B29C 43/58* (2013.01);
(Continued)

(58) Field of Classification Search
USPC .................................. 264/86, 87, 239, 259
See application file for complete search history.

(56) References Cited

U.S. PATENT DOCUMENTS 2,130,681 A * 9/1938 Forsyth ..................... D01B 1/22
162/20
2,947,356 A * 8/1960 Hornbostel ................ D21F 1/46
162/276
(Continued)

FOREIGN PATENT DOCUMENTS

JP        08025095 A  *  1/1996  ............. B30B 11/08
JP     2009-154338 A      7/2009
(Continued)

OTHER PUBLICATIONS

English Abstract of JP 08-025095 (dated Jul. 21, 2017).*
International Search Report for PCT/JP2013/085129 dated Mar. 4, 2014; English translation submitted herewith 6 pages).

*Primary Examiner* — Sing P Chan
(74) *Attorney, Agent, or Firm* — Fitch, Even, Tabin & Flannery, LLP

(57) ABSTRACT

Provided herein is an apparatus of manufacturing a molding material for use in a method of manufacturing a molding material that can prevent a crack from occurring in the molding material. A cylindrical die (3) is slid downward along an upper hollow compression mold (4) and a lower hollow compression mold (2) with a molding material (35) held between the upper hollow compression mold (4) and the lower hollow compression mold (2). After that, the upper hollow compression mold (4) is moved upward to relatively move the upper hollow compression mold (4) and the lower hollow compression mold (2) away from each other. After a slurry diffusion member (7) is removed, the molding material (35) is taken out.

12 Claims, 7 Drawing Sheets

(51) Int. Cl.
*B29C 33/44* (2006.01)
*B29C 45/17* (2006.01)
*B29C 45/26* (2006.01)
*B29C 43/36* (2006.01)
*B29B 11/12* (2006.01)
*B29B 11/16* (2006.01)
*B29C 43/58* (2006.01)
*B29C 70/12* (2006.01)
*B29D 15/00* (2006.01)
*F16H 55/06* (2006.01)
*F16H 55/17* (2006.01)
*B29K 105/12* (2006.01)
*B29L 15/00* (2006.01)

(52) U.S. Cl.
CPC .............. B29C 70/12 (2013.01); B29D 15/00 (2013.01); F16H 55/06 (2013.01); F16H 55/17 (2013.01); *B29C 2043/3628* (2013.01); *B29C 2043/5833* (2013.01); *B29K 2105/12* (2013.01); *B29L 2015/003* (2013.01); *F16H 2055/065* (2013.01)

(56) References Cited

U.S. PATENT DOCUMENTS

| | | | | |
|---|---|---|---|---|
| 3,020,189 | A * | 2/1962 | Waggoner | E04C 2/16 162/292 |
| 3,228,825 | A * | 1/1966 | Waggoner | D21F 11/00 162/101 |
| 4,240,871 | A * | 12/1980 | Burkhart | D21F 1/60 162/274 |
| 5,135,903 | A * | 8/1992 | Birkenstock | B01J 25/02 502/301 |
| 5,449,481 | A * | 9/1995 | Sagawa | B22F 3/1233 264/109 |
| 8,293,164 | B2 * | 10/2012 | Kusano | B29C 33/04 264/403 |
| 2001/0006265 | A1 * | 7/2001 | Kouda | B30B 11/08 264/109 |
| 2002/0007898 | A1 * | 1/2002 | Spica | B05D 1/20 156/180 |
| 2003/0179994 | A1 * | 9/2003 | Caracci | G02B 6/32 385/33 |
| 2013/0312924 | A1 * | 11/2013 | Shi | D21H 13/28 162/148 |
| 2016/0200004 | A1 * | 7/2016 | Ozawa | B29B 15/08 74/434 |
| 2016/0288379 | A1 * | 10/2016 | Ozawa | B29C 43/361 |
| 2016/0288428 | A1 * | 10/2016 | Ozawa | B29C 37/00 |

FOREIGN PATENT DOCUMENTS

| | | |
|---|---|---|
| JP | 2009-250364 A | 10/2009 |
| JP | 2011-152729 A | 8/2011 |
| JP | 2013-095848 A | 5/2013 |
| JP | 2013-127282 A | 6/2013 |
| JP | 2013-141826 A | 7/2013 |
| WO | 2013/172340 A1 | 11/2013 |

* cited by examiner

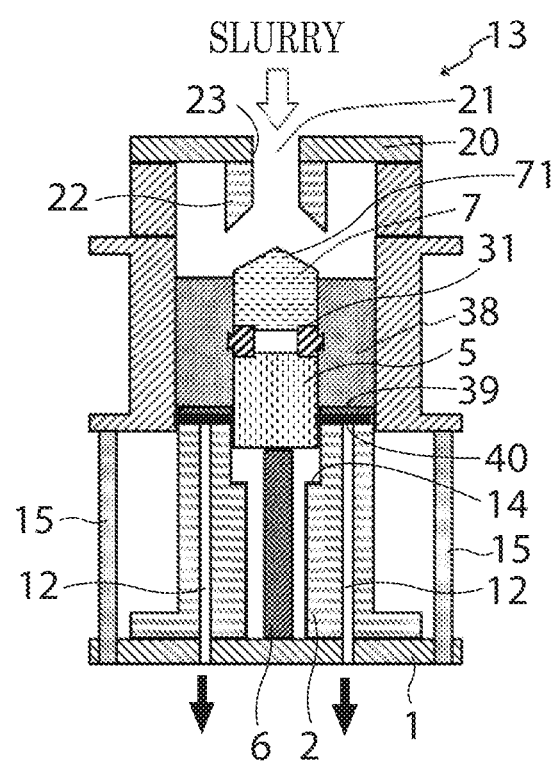

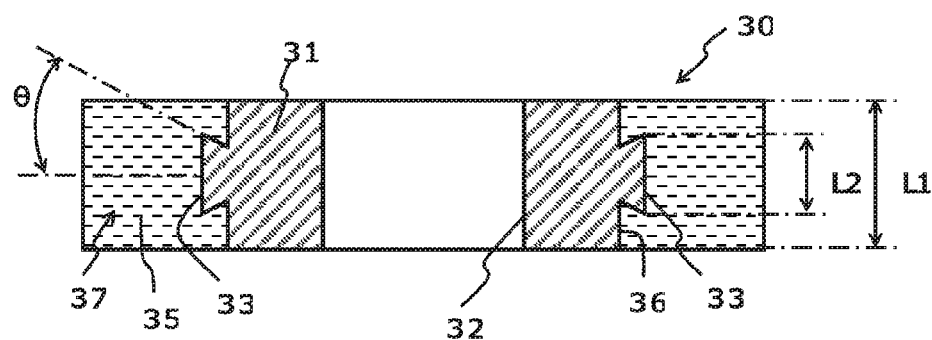
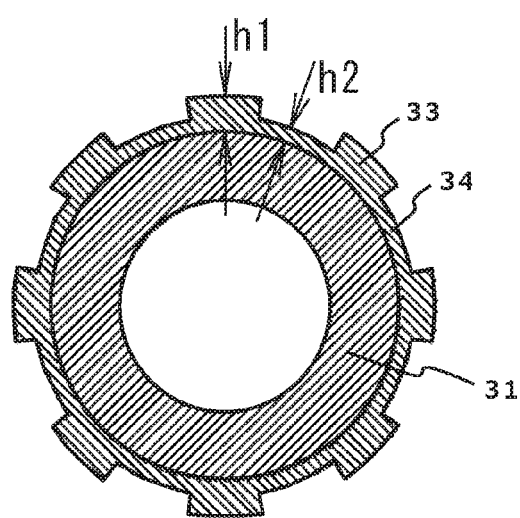 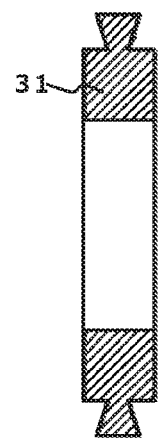

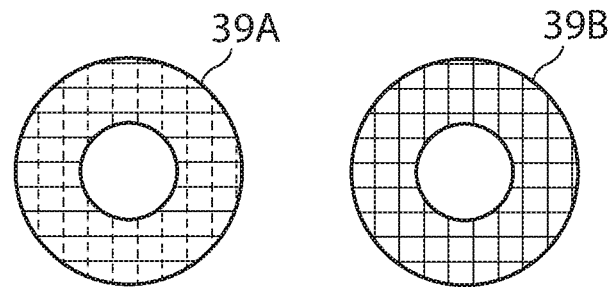
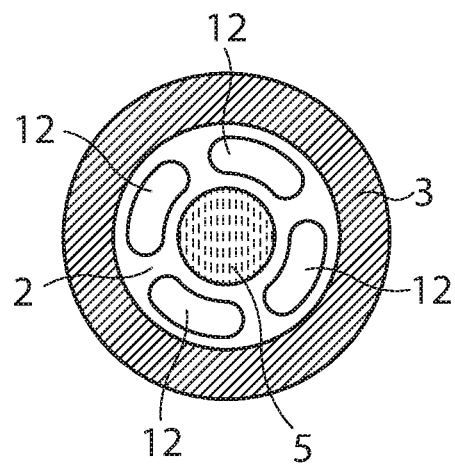
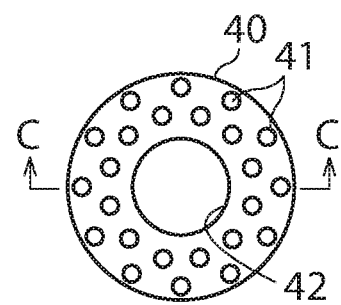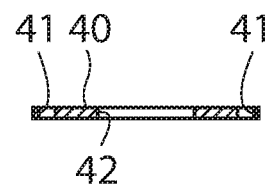

METHOD AND APPARATUS OF MANUFACTURING MOLDING MATERIAL, AND METHOD OF MANUFACTURING RESIN GEAR

CROSS-REFERENCE TO RELATED APPLICATIONS

This application is a U.S. national phase application filed under 35 U.S.C. § 371 of International Application No. PCT/JP2013/085129, filed Dec. 27, 2013, designating the United States which is hereby incorporated herein by reference in its entirety for all purposes.

TECHNICAL FIELD

The present invention relates to a method of manufacturing a molding material, a manufacturing apparatus for use in the manufacturing method, and a method of manufacturing a resin gear.

BACKGROUND ART

JP2009-154338A (Patent Document 1), JP2009-250364A (Patent Document 2), and JP2011-152729A (Patent Document 3) disclose a method of manufacturing a resin rotator, in which a reinforcement fiber substrate (molding material) is formed on the outer peripheral portion of a bushing using slurry obtained by mixing reinforcement fibers formed of short fibers and a dispersion medium such as water. In the methods described in the documents mentioned above, the slurry is poured into a cylindrical die that houses a metal bushing, water is removed from the slurry through a bottom member that has a filtration function such that reinforcement fibers will not leak out but be aggregated around the bushing to form an aggregate, and then the aggregate is compressed to form a reinforcement fiber substrate (molding material). A mold device provided with a molding die including at least a cylindrical die having an opening portion opened in an upward direction, and a lower compression mold and an upper compression mold, both of which are disposed inside the cylindrical die during molding, is used to compress the aggregate.

RELATED-ART DOCUMENT

Patent Document

Patent Document 1: JP2009-154338A
Patent Document 2: JP2009-250364A
Patent Document 3: JP2011-152729A

SUMMARY OF INVENTION

Technical Problem

Conventionally in the related art, after the aggregate is compressed, the upper compression mold is lifted up. Then the molding material is taken out by moving the cylindrical die. However, the molding material may be cracked depending on differences in conditions such as the material of the reinforcing fibers, the composition of the dispersion medium, the compression rate, and the temperature. In the related art, some work is required to maintain optimum conditions at all times to prevent a crack from occurring. Performing such work hinders improving the manufacturing efficiency.

It is an object of the present invention to provide a method of manufacturing a molding material that can prevent a crack from occurring in the molding material when the molding material is taken out.

It is another object of the present invention to provide an apparatus of manufacturing a molding material for use in the method of manufacturing a molding material that can prevent a crack from occurring in the molding material.

It is a further object of the present invention to provide a method of manufacturing a resin gear using the molding material manufactured by the method of manufacturing a molding material according to the present invention.

Solution to Problem

In an aspect of the present invention, a method of manufacturing a molding material is provided. The method includes a step of preparing a molding device, a step of preparing slurry, a step of pouring the slurry, a step of discharging a dispersion medium, a step of compressing an aggregate, and a step of taking out a molding material. The mold device includes: a molding die including at least a cylindrical die having an opening portion opened in an upward direction, and a lower compression mold and an upper compression mold, both of which are disposed inside the cylindrical die during molding. In the step of preparing slurry, slurry is prepared by dispersing short fibers or short fibers and a powdery resin in a dispersion medium. In the step of pouring the slurry, the slurry is poured into the cylindrical die with the upper compression mold placed at a stand-by position in the mold device. The molding die may include a slurry diffusion member disposed at the center of the cylindrical die to extend in the upward direction and including a slurry diffusion portion shaped such that the area of a transverse section taken along a direction orthogonal to the upward direction becomes smaller as the slurry diffusion portion extends in the upward direction. If such a slurry diffusion member is used, the slurry should be poured toward the slurry diffusion member from the upward direction.

If the slurry diffusion member is used, a step of cleaning is preferably performed after the step of pouring. In the step of cleaning, the slurry diffusion member is cleaned by pouring a dispersion medium that is the same as the dispersion medium used in the step of preparing the slurry or water onto the slurry diffusion member from above the slurry diffusion member to cause the short fibers and the powdery resin adhering to the slurry diffusion member to fall down, after the step of pouring the slurry. When such a step of cleaning is performed, the slurry or the short fibers remaining on the slurry diffusion member can be reliably caused to fall down from the slurry diffusion member. Thus, occurrence of so-called material entanglement can be prevented. Therefore, it is possible to provide a method of manufacturing a molding material that causes no damage to a die and enables continuous production. The dispersion medium or water to wash away the short fibers and the powdery resin is poured at a predetermined interval and by a small amount at one time such that the dispersion medium or water will not spill out of the die. The dispersion medium or water may be poured twice or more times (a plurality of times) to reliably wash away the short fibers and the powdery resin remaining on the upper portion of the slurry diffusion member. If the slurry diffusion member is not used, the step of cleaning is not necessary.

In the step of discharging, the dispersion medium or both of the dispersion medium and the water are discharged from the molding die to aggregate the short fibers or the short fibers and the powdery resin in the molding die to form an aggregate. The step of discharging is preferably performed at a reduced pressure atmosphere. Such a method in which slurry is poured into a die and water is discharged from the die is called "filtration-dehydration method". In the filtration-dehydration method, slurry containing short fibers is poured into a predetermined container, and the slurry is dehydrated from the container while being subjected to filtration to aggregate the short fibers or the short fibers and a powdery resin to form an aggregate. If an aggregate of short fibers or short fibers and a powdery resin is manufactured by such a method, a boundary portion that may cause separation will not be formed at the middle portion of the molding material.

In the step of compressing, the aggregate is compressed by relatively moving the upper compression mold and the lower compression mold closer to each other inside the cylindrical die to form a molding material, during or after the step of discharging. The step of compressing is preferably performed with a pressing force of 5 to 25 MPa. If the slurry contains a powdery resin, the step of compressing is preferably performed while applying heat having a temperature lower than the melting point of the powdery resin. If the aggregate of the short fibers and the powdery resin is continuously processed until the step of compressing using the same device, there is no need of dealing with an aggregate that is bulky and fragile (likely to lose shape), thereby reducing the number of working steps.

In the step of taking out the aggregate from the molding die, the cylindrical die is slid along the upper compression mold and the lower compression mold with the molding material held between the upper compression mold and the lower compression mold and subsequently the upper compression mold and the lower compression mold are relatively moved away from each other to take out the molding material. The inventors have studied and found that a crack occurs in the molding material due to the frictional resistance between the cylindrical die and the molding material. That is, it has been revealed that if the frictional resistance is large, a stress acts on an outer surface of the molding material because of the frictional resistance when the cylindrical die is moved after the upper compression mold is first lifted up as in the related art and that a crack is caused in the molding material by the stress. In the present invention, the cylindrical die is slid along the upper compression mold and the lower compression mold with the molding material held between the upper compression mold and the lower compression mold, thereby preventing a crack from occurring in the molding material, which are held between the upper and lower compression molds, even if the frictional resistance is large. Thus, in an aspect of to the present invention, a method of manufacturing a molding material that can prevent a crack from occurring in the molding material can be provided.

The distance between the upper compression mold and the lower compression mold may be slightly increased within such a range that the upper compression mold is not separated from the molding material, or a pressing force between the upper compression mold and the lower compression mold may be weakened, before the cylindrical die is slid. This allows a reduction in frictional resistance between the cylindrical die and the molding material, which leads to a smaller force required to move the cylindrical die.

In the step of taking out, pushing down the cylindrical die from the upward direction may be performed in conjunction with pulling out the cylindrical die in a downward direction to slide the cylindrical die. This prevents an increase in size of a device configured to move the cylindrical die.

The short fibers may be of various materials and types. The term "short fibers" as used in the claims of the present invention refers to not only fibers that are literally short in length, but also fine fibers obtained by fibrillating fibers and/or pulp fibers.

The powdery resin may be of various materials such as a thermosetting resin and a thermoplastic resin. The powdery resin may be of any grain shape. However, a granular shape is preferable. The grain size of the powdery resin may vary depending on the fiber diameter of the short fibers, but is preferably determined such that the powdery resin can be uniformly distributed in gaps in the aggregate of the short fibers. If the grain size is large, the fiber orientation of the short fibers in the aggregate may be disordered, and the short fibers and the resin inside a resin molded member may not be uniformly distributed when hot and pressure molding is performed to form the molded member.

At least one type of polymer flocculating agent capable of causing flocculation due to electrostatic attraction may be added to a mixed solution obtained by mixing the short fibers, the powdery resin, and water. In this case, the slurry diffusion portion of the slurry diffusion member preferably has a curved surface convexed upwardly at a leading portion thereof. When a polymer flocculating agent capable of causing flocculation due to electrostatic attraction is added, the polymer flocculating agent not only provides a flocculating function but also works as a fixing agent, which fixes the short fibers to each other and fixes the short fibers and the powdery resin to each other. As a result, it is possible to increase an amount of the short fibers and the powdery resin remaining in the aggregate when the slurry is dehydrated or water is removed from the slurry. That is, the fixation rate between the short fibers and the powdery resin can be enhanced.

Preferably, as the polymer flocculating agent capable of causing flocculation due to electrostatic attraction, a cationic polymer flocculating agent is added to the mixed solution, and then the anionic polymer flocculating agent is added to the mixed solution. Adding the cationic polymer flocculating agent to the mixed solution causes aggregation of a part of the short fibers and apart of the powdery resin to forma large number of aggregates called "flocks". Subsequently adding the anionic polymer flocculating agent accelerates aggregation of the flocks to form larger flocks, thereby forming a large number of large flocks. When such flocks are formed, the dehydration performance is improved. As a result, dehydration can be done in a short time, and the fixation rate between the short fibers and the powdery resin is improved. In particular, high dehydration performance can be achieved by using a cationic styrene-based polymer aqueous solution as the cationic polymer flocculating agent and using an anionic acrylic-based polymer aqueous solution as the anionic polymer flocculating agent.

The opening portion of the cylindrical die may be blocked by a lid member having a nozzle provided at the center to extend downward. In this case, the length and the shape of a leading end of the nozzle are determined such that the dispersion medium or the water is intensively poured onto the slurry diffusion member in the step of cleaning. This allows the dispersion medium or water to be effectively poured from the nozzle onto the slurry diffusion member, which makes it possible to reliably cause the residual short fibers and the powdery resin to fall down from the slurry diffusion member.

In another aspect of the present invention, an apparatus of manufacturing a molding material is provided. The apparatus includes a molding die, a first drive device, a second drive device, and a sequence control device. The molding die includes at least a cylindrical die, a lower compression mold, and an upper compression mold. The cylindrical die has an opening portion opened in an upward direction. The lower compression mold and the upper compression mold are disposed inside the cylindrical die during molding. The first drive device is configured to displace the cylindrical die between a molding position at which the lower compression mold is located inside the cylindrical die, and a take-out position at which a molding material can be exposed from the cylindrical die. The second drive device is configured to displace at least one of the lower compression mold and the upper compression mold to establish a first positional relationship in which the distance between the lower compression mold and the upper compression mold is maximized, and to establish a second positional relationship in which the distance between the lower compression mold and the upper compression mold is minimized. The sequence control device is configured to perform sequence control on the first drive device and the second drive device. The sequence control device performs control sequences to achieve the following operation. First, the first drive device is controlled so as to hold the cylindrical die at the molding position and the second drive device is controlled so as to establish the first positional relationship when slurry obtained by dispersing short fibers or short fibers and a powdery resin in a dispersion medium is poured into the cylindrical die. Next, the second drive device is controlled so as to establish the second positional relationship when or after an aggregate is formed by discharging the dispersion medium from the molding die to aggregate the short fibers or the short fibers and the powdery resin in the molding die, in order to compress the aggregate to form a molding material. Next, the first drive device is controlled so as to displace the cylindrical die to the take-out position after the second positional relationship is established. Finally, the second drive device is controlled so as to establish the first positional relationship after the first drive device displaces the cylindrical die to the take-out position. With the manufacturing apparatus according to the present invention, the method according to the present invention can be implemented with a simple configuration.

In the control sequences, it is preferable to increase the distance between the upper compression mold and the lower compression mold, which have been disposed in the second positional relationship, within such a range that the upper compression mold and the lower compression mold are not separated from the molding material before the cylindrical die is displaced from the molding position to the take-out position. Alternatively, it is preferable that one of the upper compression mold and the lower compression mold is temporarily deactivated. With these control sequences, frictional resistance between the cylindrical die and the molding material is reduced, thereby advantageously decreasing the force required to move the cylindrical die.

The first drive device is preferably configured to push down the cylindrical die from the upward direction in conjunction with pulling out the cylindrical die in a downward direction to slide the cylindrical die when the cylindrical die is displaced from the molding position to the take-out position. If the first drive device is configured in this way, the first drive device is required to generate only a small force, which prevents the first drive device from being larger-sized.

In a further aspect of the present invention, a resin rotator can be manufactured by applying pressure to the molding material manufactured by the manufacturing method according to the present invention while heating the molding material, thereby melting the powdery resin to generate a molten resin, impregnating a reinforcing fiber layer formed from the short fibers with the molten resin, and subsequently curing the molten resin to form a resin molded material for a resin rotator. Then, teeth can be formed on an outer peripheral portion of the resin molded member to manufacture a resin gear, after the step of forming the resin molded member.

BRIEF DESCRIPTION OF DRAWINGS

FIGS. 1A and 1B are each apart of a schematic process diagram illustrating operation of a filtration-dehydration-compression device for use in an embodiment of the present invention.

FIG. 2 is a vertical sectional view of a resin gear manufactured according to the embodiment of the present invention.

FIG. 3A is a plan view and FIG. 3B is a vertical sectional view of a metal bushing of the resin gear illustrated in FIG. 2.

FIG. 4A schematically illustrates a dutch-woven wire mesh, and FIG. 4B schematically illustrates a plain-woven wire mesh.

FIG. 5A is a plan view illustrating that a cylindrical die, a lower hollow compression mold, and a bushing support member are assembled; FIG. 5B is a plan view of a support plate, and FIG. 5C is a sectional view of FIG. 5B.

DESCRIPTION OF EMBODIMENTS

Before describing a method of manufacturing a molding material according to the present invention, an example of a filtration-dehydration-compression device for use in the manufacturing method will be described below.

<Filtration-Dehydration-Compression Device>

Figure 1A:
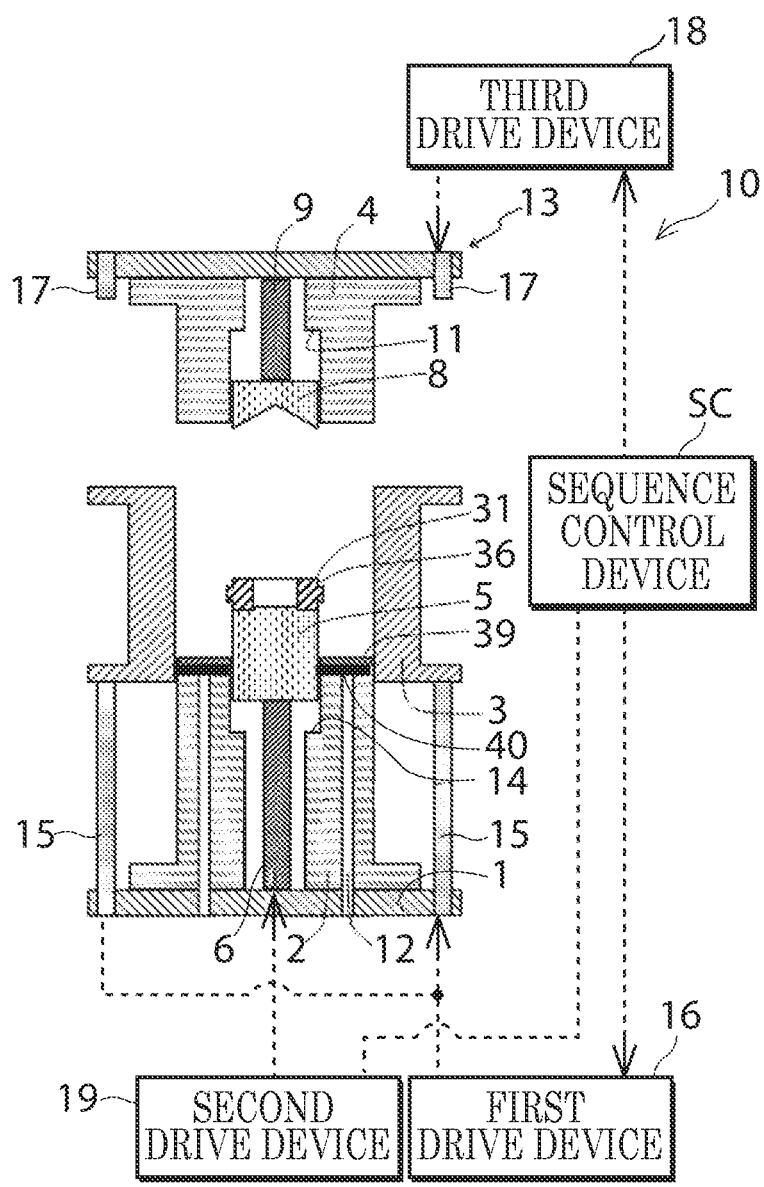

As illustrated in FIG. 1A, for example, a filtration-dehydration-compression device 13 in a manufacturing apparatus 10 for use in the method of manufacturing a molding material according to the present invention employs a molding die including a base 1, a lower hollow compression mold 2, a cylindrical die 3, and an upper hollow compression mold 4. The lower hollow compression mold 2 includes a bushing support member 5 and a lower elastic member 6. The cylindrical die 3 includes a slurry diffusion member 7. The upper hollow compression mold 4 includes a depressing member 8 and an upper elastic member 9. The manufacturing apparatus 10 includes a first drive device 16, a second drive device 19, a third drive device 18 to be discussed later, and a sequence control device SC. The first drive device 16 drives a piston 15 to displace the cylindrical die 3 between a molding position and a take-out position.

The second drive device 19 drives a piston, not illustrated, to displace the lower hollow compression mold 2 with respect to the upper hollow compression mold 4 between a stand-by position and an ascended or elevated position. The sequence control device SC performs sequence control on the first drive device 16, the second drive device 19, and the third drive device 18. In FIG. 1B and the subsequent Figures, the first drive device 16, the second drive device 19, the third drive device 18, and the sequence control device SC are omitted from the illustrations.

Now, the individual members will be described in detail below.

(Base)

The base 1 supports the entire filtration-dehydration-compression device. The lower hollow compression mold 2 is directly placed on an upper surface of the base 1. The base 1 is not specifically limited as long as the lower hollow compression mold 2 can be horizontally placed on the base 1 without the base 1 being significantly distorted by the load.

The material of the base 1 is not specifically limited, and may be stainless steel, carbon steel, aluminum, an aluminum alloy, a magnesium alloy, or the like. From the viewpoint of the corrosion resistance, stainless steel is preferably used.

The size of the base 1 is not specifically limited.

(Lower Hollow Compression Mold)

The lower hollow compression mold 2 is installed on the upper surface of the base 1 discussed above. The lower hollow compression mold 2 may be installed by means of bolts, engagement in grooves, fitting, welding, and various other methods. For ease of disassembly, the lower hollow compression mold 2 is preferably fixed to the base 1 using a plurality of bolts. In the embodiment, the lower hollow compression mold 2 is driven by the second drive device 19 to be moved together with the base 1 between the stand-by position and the ascended position. The first drive device 16 is fixed with respect to the base 1. Therefore, the first drive device 16 is moved together with the base 1 when the base 1 is ascended or elevated. Thus, as described later, when the lower hollow compression mold 2 is ascended to the ascended position, the cylindrical die 3 is also ascended together with the base 1 and the lower hollow compression mold 2. FIGS. 1A and 1B illustrate that the lower hollow compression mold 2 is in the stand-by position. A hollow portion that is open in the vertical direction is provided inside the lower hollow compression mold 2. The bushing support member 5, on the upper surface of which a bushing 31 is to be placed, is disposed in the hollow portion.

The lower surface of the bushing support member 5 is supported by the lower elastic member 6 provided on the base 1 to extend upright. The height of the bushing support member 5 from the base 1 can be varied through expansion and contraction of the lower elastic member 6. The lower elastic member 6 may not only be provided directly on the base 1 to extend upright, but also be provided indirectly on the base 1 to extend upright. A plurality of lower elastic members 6 may be installed.

The lower elastic member 6 may be any member that expands and contracts to vary the height of the bushing support member 5 as discussed earlier, and may be a coil spring, a disk spring, a plate spring, a molded member of natural or synthetic rubber, or the like. Under use conditions, however, in which the lower elastic member 6 is subjected to a strong compressive force, a spring is preferably used from the viewpoint of the durability. The material of the spring is not specifically limited. However, a spring made of stainless steel with high corrosion resistance and a spring that has been rust-proofed are preferably used. A spring made of rubber or the like may also be used.

The bushing 31 is to be placed on the upper surface of the bushing support member 5. The bushing support member 5 is preferably provided with a groove that prevents displacement of the bushing 31. If the bushing 31 is magnetic, a magnet may be used in place of a groove.

The bushing support member 5 and the lower elastic member 6 may be connected to each other by bonding or securing. The bushing support member 5 and the lower elastic member 6 are preferably detachably connected to each other so that the bushing support member 5 can be replaced according to the type of the bushing 31.

The lower hollow compression mold 2 and the bushing support member 5 are arranged such that at least a part of the bushing support member 5 gets into the hollow portion of the lower hollow compression mold 2 as seen in the horizontal direction, and how far the bushing support member 5 gets into the hollow portion is varied through expansion and contraction of the lower elastic member 6. If the bushing support member 5 is moved out of the hollow portion of the lower hollow compression mold 2 as seen in the horizontal direction due to expansion of the lower elastic member 6 during normal operation, this is not practical because misalignment of the bushing support member 5 may be caused when the bushing support member 5 is moved back into the lower hollow compression mold 2 due to contraction of the lower elastic member 6.

A stepped portion 14 is provided on the inner wall of the lower hollow compression mold 2 including therein the hollow portion. The stepped portion 14 contacts the lower portion of the bushing support member 5 to prevent the bushing support member 5 from moving downward due to contraction of the lower elastic member 6. The stepped portion 14 is preferably formed by varying the inside diameter of the hollow portion of the lower hollow compression mold 2 or providing projections on the inner wall of the lower hollow compression mold 2.

The stepped portion 14 is not necessarily provided over the entire circumference of the inner wall of the lower hollow compression mold 2, and may be provided on a part of the inner wall of the lower hollow compression mold 2. If the stepped portion 14 is provided on a part of the inner wall of the lower hollow compression mold 2, the stepped portion 14 is preferably provided at three or more locations at equal angular intervals in order to keep the bushing support member 5 horizontal.

The position of the stepped portion 14 can be varied according to the final thickness of the aggregate of the short fibers or the aggregate of the short fibers and the powdery resin. The stepped portion 14 is preferably provided at such a position that molding material layers having an equal thickness in the upward and downward directions can be formed to extend from the center of the bushing 31 in the thickness direction. Specifically, the stepped portion 14 of the lower hollow compression mold 2 and a stepped portion 11 of the upper hollow compression mold 4 to be discussed later are preferably located such that the distance from the upper end of the lower hollow compression mold 2 to the center of the bushing in the thickness direction when the stepped portion 14 of the lower hollow compression mold 2 and the bushing support member 5 contact each other is equal to the distance from the lower end of the upper hollow compression mold 4 to the center of the bushing in the thickness direction when the stepped portion 11 of the upper hollow compression mold 4 and the depressing member 8 contact each other.

Slurry to be discussed later is poured onto a bottom portion which is a portion of the upper surface of the lower hollow compression mold 2 excluding an upper opening of the hollow portion. Therefore, drain passages 12 each including a discharge port are preferably provided in the upper surface of the lower hollow compression mold 2 to discharge a dispersion medium in the slurry. More preferably, a pump for vacuum suctioning is connected to the drain passages 12. If the thus configured lower hollow compression mold 2 is used, the time for filtration and dehydration can be shortened.

(Cylindrical Die)

The cylindrical die 3 has upper and lower opening portions. The lower hollow compression mold 2 is inserted into the lower opening portion of the cylindrical die 3 to tightly contact the outer periphery of the cylindrical die so that the slurry will not leak out of the die. The upper hollow compression mold 4 to be discussed later is inserted into the upper opening portion of the cylindrical die 3.

Considering the coefficient of thermal expansion etc., and because it is necessary for the cylindrical die 3 to have a compressive distortion factor equivalent to the compressive distortion factor of the lower hollow compression mold 2, the material of the cylindrical die 3 is preferably the same as the material of the lower hollow compression mold 2.

The length of the cylindrical die 3 in the vertical direction is not specifically limited. However, the cylindrical die 3 is preferably at least long enough not to cause slurry leakage when a prescribed amount of slurry is poured into the cylindrical die 3.

The slurry diffusion member 7 is disposed in the center of the cylindrical die 3. The slurry diffusion member 7 is located on the upper surface of the bushing 31 placed on the bushing support member 5. As described in relation to the upper surface of the bushing support member 5, the lower surface of the slurry diffusion member 7 is preferably provided with a groove that prevents misalignment with the bushing 31. If the bushing 31 is magnetic, a magnet may be used in place of a groove.

The slurry diffusion member 7 includes a slurry diffusion portion 71 provided at an upper end portion thereof. The slurry diffusion portion 71 extends in the upward direction, and is shaped such that the area of a transverse section taken along a direction orthogonal to the upward direction becomes smaller as the slurry diffusion portion 71 extends in the upward direction. In the example of FIG. 1B, the slurry diffusion portion 71 has a conical shape with its apex located in the upward direction. The apex of the conical shape has a curved surface, the radius of curvature of which is 10 mm or more and 20 mm or less. When the slurry is poured into the cylindrical die 3 onto the slurry diffusion portion 71 from above the slurry diffusion portion 71, the short fibers and the powdery resin in the slurry can be uniformly dispersed around the bushing without the short fibers which have been flocculated or the short fibers and the powdery resin which have been flocculated being caught by the upper end of the slurry diffusion member 7.

It is not necessary that the slurry diffusion member 7 should be fixed to the upper surface of the bushing 31 unless any misalignment occurs, and the slurry diffusion member 7 may be simply placed on the upper surface of the bushing 31.

(Upper Hollow Compression Mold)

The upper hollow compression mold 4 is disposed opposite to the lower hollow compression mold 2, and inserted into the upper opening portion of the cylindrical die 3. In the embodiment, the upper hollow compression mold 4 is fixedly disposed. Thus, by moving the cylindrical die 3 toward the upper hollow compression mold 4 together with the base 1 by the second drive device 19, the outer periphery of the upper hollow compression mold 4 and the inner wall of the cylindrical die 3 tightly contact each other when the upper hollow compression mold 4 and the cylindrical die 3 are fitted with each other, thereby preventing slurry leakage.

Considering the coefficient of thermal expansion etc., and because it is necessary for the upper hollow compression mold 4 to have a compressive distortion factor equivalent to the compressive distortion factor of the lower hollow compression mold 2 and the cylindrical die 3, the material of the upper hollow compression mold 4 is preferably the same as the material of the lower hollow compression mold 2 and the cylindrical die 3.

The depressing member 8 is provided in the hollow portion of the upper hollow compression mold 4. The depressing member 8 contacts the slurry diffusion portion 71 of the slurry diffusion member 7. An upper surface of the depressing member 8 is supported by the upper elastic member 9. The position of the depressing member 8 is varied through expansion and contraction of the upper elastic member 9.

The upper elastic member 9 may be the same as or different from the lower elastic member 6 discussed earlier. Under use conditions, however, in which the lower hollow compression mold 2 is heated or the upper elastic member 9 is subjected to a strong compressive force, a spring is preferably used as the upper elastic member 9 from the viewpoint of the durability. The upper elastic member 9 and the lower elastic member 6 are preferably springs having the same spring constant. The thus configured elastic members allow the molding material to be compressed from above and from below at an equal speed, thereby reducing fluctuations in density of the short fibers and the powdery resin in the vertical direction.

The depressing member 8 and the upper elastic member 9 may be connected to each other by bonding or securing. The depressing member 8 and the upper elastic member 9 are preferably detachably connected to each other so that the depressing member 8 can be replaced according to the type of the bushing 31.

The upper hollow compression mold 4 and the depressing member 8 are arranged such that at least a part of the depressing member 8 gets into the hollow portion of the upper hollow compression mold 4 as seen in the horizontal direction, and how far the depressing member 8 gets into the hollow portion is varied through expansion and contraction of the upper elastic member 9. If the depressing member 8 is moved out of the hollow portion of the upper hollow compression mold 4 as seen in the horizontal direction due to expansion of the upper elastic member 9 during normal operation, this is not practical because misalignment of the depressing member 8 may be caused when the depressing member 8 is moved back into the upper hollow compression mold 4 due to contraction of the upper elastic member 9.

A stepped portion 11 is provided on the inner wall of the upper hollow compression mold 4 including therein the hollow portion. The stepped portion 11 contacts the upper portion of the depressing member 8 to prevent the depressing member 8 from moving upward due to contraction of the upper elastic member 9. The stepped portion 11 is preferably formed by varying the inside diameter of the hollow portion of the upper hollow compression mold 4 or providing projections on the inner wall of the upper hollow compression mold 4.

The stepped portion 11 is not necessarily provided over the entire circumference of the inner wall of the upper hollow compression mold 4, and may be provided on a part of the inner wall of the upper hollow compression mold 4. If the stepped portion 11 is provided on a part of the inner wall of the upper hollow compression mold 4, the stepped portion 11 is preferably provided at three or more locations at equal angular intervals in order to keep the depressing member 8 horizontal.

The position of the stepped portion 11 can be determined as discussed in relation to the stepped portion 14 of the lower hollow compression mold 2. Specifically, the stepped portion 14 of the lower hollow compression mold 2 discussed earlier and the stepped portion 11 of the upper hollow compression mold 4 are preferably located such that the distance from the upper end of the lower hollow compression mold 2 to the center of the bushing in the thickness direction when the stepped portion 14 of the lower hollow compression mold 2 and the bushing support member 5 contact each other is equal to the distance from the lower end of the upper hollow compression mold 4 to the center of the bushing in the thickness direction when the stepped portion 11 of the upper hollow compression mold 4 and the depressing member 8 contact each other.

The temperature of the lower surface of the upper hollow compression mold 4 may be adjustable. If the lower surface of the upper hollow compression mold 4 is heated during compression, liquid adhering to the short fibers and the powdery resin can be quickly dried. Here, the heating temperature should be equal to or less than the melting point of the powdery resin used. This is because if the powdery resin is heated at a temperature more than the melting point of the powdery resin, the powdery resin adheres to the lower surface of the upper hollow compression mold 4 and the inner peripheral surface of the cylindrical die 3, thereby making continuous production difficult.

The temperature may be adjusted by varying the resistance value of a heater with a variable transistor, or simply by turning on and off a heater.

(Slurry Injection Upper Mold)

The filtration-dehydration-compression device may include a slurry injection upper mold 20 that constitutes a lid member configured to allow pouring of slurry as necessary (see FIG. 1B). In order to fabricate a molding material in which the weight of short fibers or short fibers and a powdery resin accumulated around the bushing 31 is uniform, a slurry injection hole 21 of the slurry injection upper mold 20 is located over the slurry diffusion member 7. As in the embodiment, the slurry injection hole 21 is preferably disposed directly above the slurry diffusion member 7.

In the embodiment, a nozzle 22 is fixed to the back surface of the slurry injection upper mold 20. The nozzle 22 includes an inner wall 23 that communicates with the slurry injection hole 21. The nozzle 22 extends toward the slurry diffusion member 7. The length and the shape of a leading end of the nozzle 22 are determined such that the dispersion medium or the water is intensively poured onto the slurry diffusion portion 71 in a step of cleaning to be discussed later. Specifically, the nozzle 22 is shaped such that the end surface of the leading portion of the nozzle 22 becomes larger as the nozzle 22 extends toward the slurry diffusion portion 71 (the area of a transverse section taken along a direction orthogonal to the vertical direction becomes larger as the nozzle 22 extends toward the slurry diffusion portion 71). The distance between the end surface of the leading portion of the nozzle 22 and the surface of the slurry diffusion portion 71 is determined as desired according to the viscosity of the slurry, the length of the short fibers, and so forth.

The nozzle 22 is provided to allow the dispersion medium or the water to be intensively and efficiently poured onto the slurry diffusion portion 71 in order to prevent the short fibers and the powdery resin from being entangled between die components to break the die in a step of compressing (in the step of compressing an aggregate of the short fibers and the powdery resin), which is performed after the step of pouring the slurry, if the short fibers and the powdery resin adhere to and remain on the slurry diffusion portion 71 of the slurry diffusion member 7. That is, if the nozzle 22 is provided, it is possible to efficiently cause the short fibers and the powdery resin adhering to the slurry diffusion member 7 to fall down with a small amount of the dispersion medium or the water when the dispersion medium or the water is poured from the nozzle 22 after the slurry is poured.

The slurry injection upper mold 20 preferably tightly contacts a peripheral edge portion of the opening portion of the cylindrical die 3 during pouring of the slurry. This prevents the slurry from overflowing out of the cylindrical die 3.

<Bushing>

The bushing 31 is held between the bushing support member 5 and the slurry diffusion member 7. The bushing support member 5 and the slurry diffusion member 7 sandwich and support a portion of the metal bushing 31 located on the inner side with respect to an outer peripheral portion 36 of the metal bushing 31 at both sides in an extending direction of the center line of the cylindrical die 3 such that the short fibers and the powdery resin will not enter an area from the center portion of the metal bushing 31 to the outer peripheral portion 36 of the metal bushing 31, or a further inner area of the metal bushing 31.

To interpose the metal bushing 31 between the bushing support member 5 and the slurry diffusion member 7, the slurry diffusion member 7 is placed on the bushing 31 to hold the metal bushing 31 using the weight of the slurry diffusion member 7 as illustrated in FIG. 1B.

The bushing 31 will be discussed in detail below. The bushing 31 is located in the center of the molding material in a radial direction. If the desired final product is a resin gear, the bushing 31 is fixed to a rotary shaft for use. The material of the bushing 31 is not specifically limited. In consideration of the strength, however, the bushing 31 is preferably made of metal.

FIG. 2 is a schematic vertical sectional view of a resin gear 30. The resin gear 30 includes the metal bushing 31 rotatably fixed to a rotary shaft, not illustrated. A through hole 32 to be fitted with the rotary shaft, not illustrated, is formed in the center portion of the metal bushing 31.

A plurality of projecting portions 33 to serve as detent portions are integrally formed on the outer peripheral portion of the metal bushing 31 at predetermined intervals in the circumferential direction.

A specific example of the metal bushing 31 will be described. The thickness L2 of the plurality of projecting portions 33 as measured in the axial direction is smaller than the thickness L1 of the metal bushing 31 as measured in the axial direction. The projecting portions 33 which serve as detent portions each have an undercut shape in which the top portion has a large thickness and the base portion has a smaller thickness. The undercut shape is intended to prevent idling of only the metal bushing 31 due to an interface fracture that occurs at the interface with the surrounding molded resin portion. The angle θ in the sectional surface in the direction of the rotational axis of the metal bushing 31 is 5 to 40°.

In order to enhance the effect of the detent portions to endure a load in the rotational direction, as illustrated in FIG. 3, the metal bushing 31 preferably includes the projecting portions 33 serving as detent portions and having at least a height h1, and recessed portions 34 formed between two projecting portions 33 to constitute a bottom portion having a height h2. The projecting portions 33 and the recessed portions 34 are alternately arranged. If the metal bushing 31 including the projecting portions 33 of such an undercut shape and having an angle θ of 5 to 40°, preferably 10 to 35°, is used, the plurality of projecting portions 33 which serve as detent portions are completely embedded in the molding material to provide sufficient strength of the mechanical coupling between the molding material and the metal bushing 31.

<Bottom Member>

As illustrated in FIG. 1B, the lower hollow compression mold 2 has the drain passages 12 to discharge the dispersion medium in order to impart permeability to the dispersion medium contained in an aggregate 38 of the short fibers or an aggregate 38 of the short fibers and the powdery resin. A vacuum suction pump, not illustrated, may be attached to the drain passages 12 to complete discharging of the dispersion medium in a short time. In the example, a bottom member 39 is disposed on the upper surface of the lower hollow compression mold 2 to prevent an outflow of the short fibers during the discharging of the dispersion medium from the drain passages 12.

A wire mesh can be used as the bottom member 39. In the embodiment, as illustrated in FIGS. 1, 4A, and 4B, the bottom member 39 is constituted of two layers of wire meshes including an annular dutch-woven wire mesh 39A made of stainless steel and an annular plain-woven wire mesh 39B made of stainless steel. The two layers of wire meshes are secured to each other by sintering. Such a bottom member 39 can enhance the mechanical strength without significantly reducing the filtration performance. The plain-woven wire mesh 39B has a filtration function. The dutch-woven wire mesh 39A has a function of reinforcing the plain-woven wire mesh 39B without significantly affecting the drainage performance. In addition to the dutch-woven wire mesh 39A and the plain-woven wire mesh 39B, the bottom member 39 may include an additional wire mesh. The additional wire mesh may be any wire mesh that enhances the functions of the dutch-woven wire mesh 39A and the plain-woven wire mesh 39B. The additional wire mesh is also coupled to the adjacent wire mesh by sintering. Preferably, the dutch-woven wire mesh 39A has a filtration grain size of 150 µm or more, and the plain-woven wire mesh 39B has a hole opening rate of 35% or more and 55% or less, for example. If the filtration grain size is less than 150 µm, the powdery resin in the slurry to be discussed later clogs the dutch-woven wire mesh 39A, which hinders drainage. If the hole opening rate of the plain-woven wire mesh 39B is less than 35%, the drainage performance is lowered. If the hole opening rate is more than 55%, the reinforcing function is reduced. Herein, the term "hole opening rate" refers to the proportion of the opening hole portion per area, and the term "filtration grain size" refers to the maximum grain size of beads such as glass beads that pass through the wire mesh.

Further, in the embodiment, as illustrated in FIGS. 1B and 5B, a support plate 40 made of stainless steel is disposed between the bottom member 39 and the lower hollow compression mold 2. The support plate 40 has a plurality of through holes 41 formed therein, and supports the bottom member 39. Using the support plate 40 can enhance the mechanical strength of the bottom member 39. The mechanical strength of the support plate 40 used in the embodiment is higher than the mechanical strength of the bottom member 39. In consideration of possible reduced filtration speed of the bottom member 39, the support plate 40 preferably has an opening rate that is higher than the opening rate of the drain passages 12 of the lower hollow compression mold 2 and that is equal to or more than the opening rate of the bottom member 39. If the opening rates are configured in this way, the support plate 40 will not substantially work to reduce the filtration speed. Specifically, the support plate 40 is preferably dotted with the plurality of through holes 41 such that the opening rate of the support plate 40 is 35% or more and 55% or less. If the opening rate is less than 35%, the support plate 40 hinders drainage. If the opening rate is more than 55%, the function of the support plate 40 to support the bottom member 39 is degraded. Replacement of the support plate is significantly less frequent than replacement of the bottom member, thereby significantly reducing maintenance costs.

In the embodiment, as illustrated in FIG. 5C, grooves 42 configured to connect between the plurality of drain passages 12 of the lower hollow compression mold 2 and the through holes 41 of the support plate 40 are disposed in a surface of the support plate 40 that opposes the lower hollow compression mold 2. If such grooves 42 are disposed, the support plate 40 can be effectively prevented from hindering drainage. In the embodiment, as illustrated in FIG. 5A, the drain passages 12 provided in the lower hollow compression mold 2 each have a narrow arcuate transverse sectional shape. Providing the drain passages 12 with such a narrow transverse sectional shape may cause deformation of the bottom member 39, although the drainage performance is improved. In the embodiment, however, the support plate 40 is provided, and such a problem is not raised.

<Slurry>

Next, the slurry used in the embodiment will be described. The present invention is not limited to the use of the slurry used in the embodiment.

(Dispersion Medium for Slurry)

The dispersion medium used for the slurry is not specifically limited as long as the short fibers or the short fibers and the powdery resin can be dispersed in the dispersion medium and the dispersion medium will not badly affect the properties of the short fibers and the powdery resin used. Examples of the dispersion medium include an organic solvent, a mixture of an organic solvent and water, and water. It is preferable to use water which is particularly economical and imposes little load on the environment.

If an organic solvent is used, sufficient caution should be given to safety. An organic solvent such as methanol, ethanol, acetone, toluene, and diethyl ether may be used.

At least one type of polymer flocculating agent capable of causing flocculation due to electrostatic attraction may be added to a mixed solution obtained by mixing the short fibers, the powdery resin, and the dispersion medium.

(Short Fibers)

The short fibers to be dispersed in the dispersion medium preferably have a melting point or a decomposition temperature of 250° or more. If such short fibers are used, the short fibers will not thermally be degraded at the molding and processing temperatures during molding and at the atmospheric temperature during actual use, thereby providing a molding material or a resin gear with high heat resistance.

As such short fibers, at least one kind of short fibers selected from para-aramid fibers, meta-aramid fibers, carbon fibers, glass fibers, boron fibers, ceramic fibers, ultra-high strength polyethylene fibers, polyketone fibers, poly(p-phenylenebenzobisoxazole) fibers, wholly aromatic polyester fibers, polyimide fibers, and polyvinyl alcohol fibers is preferably used. In particular, mixed fibers of para-aramid fibers and meta-aramid fibers have good balance among heat resistance, strength, and processability after resin molding.

The short fibers preferably contain at least 20% by volume or more of high-strength high-modulus fibers having a tensile strength of 15 cN/dtex or more and a tensile modulus of 350 cN/dtex or more.

The single fiber fineness (thickness) of the short fibers is preferably in the range of 0.1 to 5.5 dtex, more preferably 0.3 to 2.5 dtex.

The length of the short fibers is not specifically limited. However, the length of the short fibers is preferably 1 to 12 mm, more preferably 2 to 6 mm. If the fiber length is less than 1 mm, the mechanical properties of the fiber-reinforced resin molded member are gradually degraded. If the fiber length is more than 12 mm, not only the short fibers are entangled so much that it is difficult to form a uniform fabric, but also the short fibers dispersed in the dispersion medium disadvantageously gradually clog a pipe for transport of the short fibers to the filtration-dehydration-compression device.

The ratio of the proportion of the short fibers to be contained in the resin molded member is preferably determined such that the resin molded member has high strength, the short fibers are reliably filled and the resin molded member is not prevented from being impregnated with a resin well. The ratio of the short fibers is particularly preferably 35 to 45% by volume.

In order to impart strength for maintaining the shape during movement or transfer to the next process to a molding material 35 integrally formed with the metal bushing 31 using the filtration-dehydration-compression device 13 illustrated in FIG. 1A, it is desirable that the short fibers should contain fine fibers obtained by fibrillating aramid fibers, such that the fine fibers may have a freeness of 100 to 400 ml and that the fine fibers account for 30 mass % or less of the total short fibers.

(Powdery Resin)

The powdery resin may be of various materials such as a thermosetting resin and a thermoplastic resin. Examples of the powdery resin include a combination of one or more resins selected from an epoxy resin, a polyaminoamide resin, a phenol resin, an unsaturated polyester resin, a polyimide resin, a polyether sulfone resin, a polyether ether ketone resin, a polyamide-imide resin, a polyamide resin, a polyester resin, a polyphenylene sulfide resin, a polyethylene resin, and a polypropylene resin. Among these, a phenol resin is preferable from the viewpoint of the strength, heat resistance, etc. of the cured resin.

The powdery resin may be of any grain shape. However, a granular shape is preferable. The grain size of the powdery resin may vary depending on the fiber diameter of the short fibers, but is preferably 50 μm or less. The grain size is measured by the metal mesh sieving method prescribed by JIS-Z8801-1. This allows the powdery resin to be uniformly distributed in gaps in the aggregate of the short fibers.

(Dispersion Concentration of Short Fibers and Powdery Resin)

The dispersion concentration of the short fibers and the powdery resin in the dispersion medium is preferably 0.3 g/liter or more and 20 g/liter or less.

<Resin Rotator>

A resin gear suitably manufactured using the molding material manufactured in the embodiment will be described below.

A resin rotator is obtained by applying pressure to the molding material while heating the molding material, thereby melting the powdery resin to generate a molten resin; impregnating a reinforcing fiber layer formed from the short fibers with the molten resin; subsequently curing the molten resin; and forming a resin molded member for the resin rotator. If the molding material does not contain resin powder, the molding material is additionally impregnated with a liquid resin, and heated for curing. The resin molded member is formed in this way. Further, teeth can be formed on an outer peripheral portion of the resin molded member to form the resin molded member into a gear shape. More specifically, the resin gear including a metal bushing 31 to be fitted with a rotary shaft that rotates the gear and a tooth portion disposed around the metal bushing 31 may suitably be used.

The tooth portion is disposed on the outer periphery of the metal bushing 31 discussed earlier. More specifically, as illustrated in FIG. 2 and described earlier, one molding material 35 is disposed at a position on the outer side of the outer peripheral portion 36 of the metal bushing 31, and fitted with the outer peripheral portion 36. Then, the molding material 35 is impregnated with a resin, and the resin is cured to form a resin molded member 37. The tooth portion is thus formed on the outer periphery of the resin molded member 37.

<Drive of Filtration-Dehydration-Compression Device>

The filtration-dehydration-compression device 13 includes the second drive device 19, the first drive device 16, the third drive device 18, and the sequence control device SC discussed earlier. The second drive device 19 varies the offset distance between the lower hollow compression mold 2 and the upper hollow compression mold 4. The first drive device 16 moves the cylindrical die 3. The third drive device 18 is used together with the first drive device 16 to move the cylindrical die 3. The sequence control device SC performs sequence control on the first drive device 16, the second drive device 19, and the third drive device 18. In the embodiment, the second drive device 19 is configured to displace the lower hollow compression mold 2 to establish a first positional relationship in which the distance between the lower hollow compression mold 2 and the upper hollow compression mold 4 is maximized, and to establish a second positional relationship in which the distance between the lower hollow compression mold 2 and the upper hollow compression mold 4 is minimized. In the embodiment, specifically, in the dehydration step, the second drive device 19 moves the lower hollow compression mold 2 together with the base 1 with the upper hollow compression mold 4 being stationary. The drive source is not specifically limited, and an electric pressing machine with controllable moving speed and pressing force may be used.

Figure 6A:
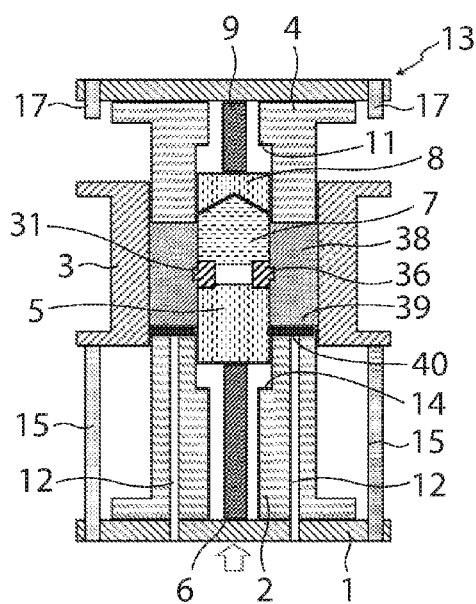
FIGS. 6A to 6D are each a part of a schematic process diagram illustrating operation of the filtration-dehydration-compression device for use in the embodiment of the present invention.

The sequence control device SC performs control sequences as follows. First, the first drive device 16 is controlled so as to position the cylindrical die 3 at the molding position at which the upper end portion of the lower hollow compression mold 2 is located in the lower end portion of the cylindrical die 3, when slurry obtained by dispersing short fibers or short fibers and a powdery resin in a dispersion medium is poured into the cylindrical die 3 with the slurry injection upper mold 20 tightly contacting the peripheral edge portion of the opening portion of the cylindrical die 3. In addition, as illustrated in FIG. 1B, the second drive device 19 is controlled so as to hold the lower hollow compression mold 2 at the stand-by position. Next, as illustrated in FIG. 6A, the upper hollow compression mold 4 is fixed in position such that the lower end portion of the upper hollow compression mold 4 is located in the upper end portion of the cylindrical die 3, when or after an aggregate is formed by discharging the dispersion medium from the molding die to aggregate the short fibers or the short fibers and the powdery resin in the molding die, in order to compress the aggregate to form a molding material. A device that fixes the upper hollow compression mold 4 is not illustrated. In the state of FIG. 6A, the first positional relationship in which the distance between the lower hollow compression mold 2 and the upper hollow compression mold 4 is maximized has been established.

Figure 6B:
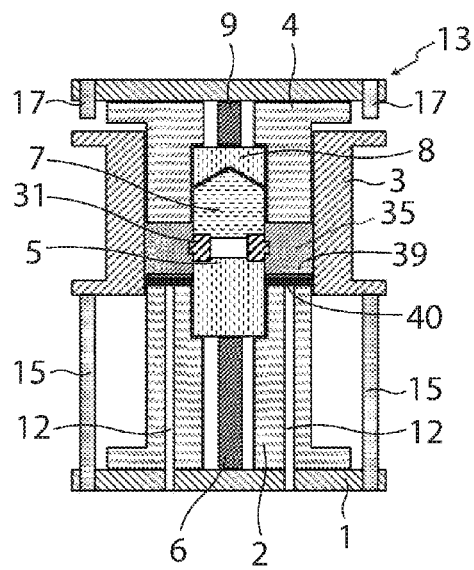

Next, as illustrated in FIG. 6B, the second drive device 19 is controlled so as to displace the lower hollow compression mold 2 to the ascended or elevated position. In the embodiment, at this point, the first drive device 16 is controlled so as to also displace the cylindrical die 3 to the ascended position together with the lower hollow compression mold 2. Even in this state, the relative positional relationship between the lower hollow compression mold 2 and the cylindrical die 3 has not been varied. In this state, therefore, the cylindrical die 3 and the lower hollow compression mold 2 can be considered as being located at the molding position. In the state of FIG. 6B, the distance between the lower hollow compression mold 2 and the upper hollow compression mold 4 has been minimized when the lower hollow compression mold 2 is located at the ascended position, and the second positional relationship has been established between the lower hollow compression mold 2 and the upper hollow compression mold 4.

Figure 6C:
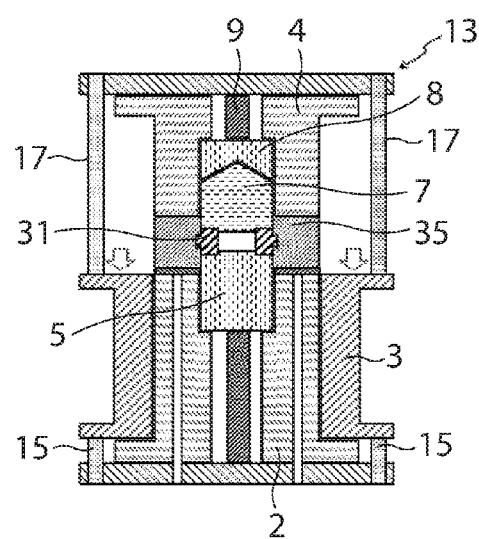

Next, as illustrated in FIG. 6C, the sequence control device SC controls the first drive device 16 so as to displace the cylindrical die 3 to the take-out position at which the molding material 35 can be exposed from the cylindrical die 3. That is, the cylindrical die 3 is displaced to the take-out position by controlling the first drive device 16 so as to lower the piston 15. In the embodiment, in order to assist the first drive device 16, the third drive device 18, which is provided on the upper hollow compression mold 4 side, is driven to push down the piston 17 of the third drive device also to apply a push-down force to the cylindrical die 3.

Figure 6D:
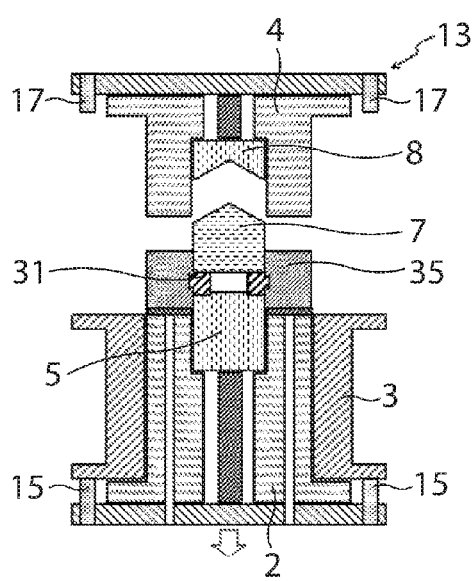

Finally, as illustrated in FIG. 6D, the sequence control device SC controls the second drive device 19 so as to displace the lower hollow compression mold 2 from the ascended position to the stand-by position after the first drive device 16 displaces the cylindrical die 3 to the take-out position. In the embodiment, as a result of the second drive device 19 displacing the base 1 to the stand-by position on the lower side, the first positional relationship has been established between the lower hollow compression mold 2 and the upper hollow compression mold 4 where the distance between the lower hollow compression mold 2 and the upper hollow compression mold 4 is minimized.

Method of Manufacturing Molding Material According to First Embodiment

A method of manufacturing a molding material according to a first embodiment of the present invention will be described below.

As schematically illustrated in FIGS. 1B and 6, the molding material 35 is formed using the filtration-dehydration-compression device 13, by forming an aggregate 38 of the short fibers and the powdery resin on the outer side of the outer peripheral portion 36 of the metal bushing 31 and compressing the aggregate 38 of the short fibers and the powdery resin in the axial direction of a rotary shaft, not illustrated, that rotates the metal bushing 31. In FIG. 6, the first and second drive devices 16 and 19 and the sequence control device SC, which are illustrated in FIG. 1A, are not illustrated.

First, the step of pouring, in which the short fibers and the powdery resin are accumulated around the outer peripheral portion of the metal bushing 31 by a filtration-dehydration method, will be described.

<Step of Pouring>

As illustrated in FIG. 1, in the step of pouring, the sequence control device SC controls the first drive device 16 so as to hold the cylindrical die 3 at the molding position at which the lower hollow compression mold 2 is located in the cylindrical die 3, when slurry obtained by dispersing short fibers or short fibers and a powdery resin in a dispersion medium is poured into the cylindrical die 3.

Specifically, in the step of pouring, slurry is poured into the cylindrical die 3 onto the slurry diffusion member 7 from above the slurry diffusion member 7. The slurry is temporarily stored in the cylindrical die 3, or the dispersion medium is discharged from the cylindrical die 3 in parallel with the pouring of the slurry.

As illustrated in FIG. 1B, slurry formed by dispersing short fibers and a powdery resin in a dispersion medium is supplied from the slurry injection hole 21 with the slurry injection upper mold 20 tightly contacting the peripheral edge portion of the opening portion of the cylindrical die 3.

The slurry is supplied onto the slurry diffusion member 7 from above the slurry diffusion member 7, which causes the short fibers and the powdery resin to be diffused by the slurry diffusion portion 71 and to be spread as uniformly distributed around the slurry diffusion member 7.

<Step of Cleaning>

In the step of cleaning, a dispersion medium that is the same as the dispersion medium used in the step of pouring or water is poured onto the slurry diffusion member 7 from above the slurry diffusion member 7 to cause the short fibers and the powdery resin adhering to the slurry diffusion portion 71 of the slurry diffusion member 7 to fall down.

After the slurry is poured in the step of pouring, short fibers and a powdery resin adhere to and remain on the upper portion of the slurry diffusion portion 71 of the slurry diffusion member 7. If short fibers and a powdery resin remain on the slurry diffusion member 7, the short fibers and the powdery resin may be entangled between the upper hollow compression mold 4 and the slurry diffusion member 7, and the depressing member 8 and the slurry diffusion member 7 during the discharging of the dispersion medium in the step of discharging or in the step of compressing in which the aggregate of the short fibers and the powdery resin is compressed after the discharging of the dispersion medium. If such entanglement occurs, the die may be broken to disenable continuous production. Thus, after the slurry is poured, a dispersion medium that is the same as the dispersion medium for the slurry or water is poured form the slurry injection hole 21 via the nozzle 22 to wash away the short fibers and the powdery resin remaining on the upper surface of the slurry diffusion portion 71 of the slurry diffusion member 7.

Pouring of the dispersion medium or water to wash away the short fibers and the powdery resin is preferably started at the timing when the liquid surface of the slurry in the die reaches the upper surface of the aggregate of the short fibers and the powdery resin accumulated in the die.

The dispersion medium or water poured to wash away the short fibers and the powdery resin is poured by a small amount such that the dispersion medium or water will not spill out of the die. The dispersion medium or water may be poured twice or more times (a plurality of times) to reliably wash away the short fibers and the powdery resin remaining on the upper portion of the slurry diffusion member 7.

If the dispersion medium or water is poured twice or more times, the interval between pourings is preferably defined as a time required until the liquid surface of the dispersion medium or water poured earlier is lowered to the upper surface of the aggregate of the short fibers and the powdery resin accumulated in the die.

<Step of Discharging and Step of Compressing>

After an aggregate 38 is formed by discharging the dispersion medium from the molding die 3 to aggregate the short fibers or the short fibers and the powdery resin in the molding die 3, the upper hollow compression mold 4 is fixed at such a position that the lower end portion of the upper hollow compression mold 4 gets into the cylindrical die 3 as illustrated in FIG. 6A in order to compress the aggregate 38 to form a molding material 35. In the step of discharging, the dispersion medium is discharged from the cylindrical die 3 to accumulate the short fibers and the powdery resin in the cylindrical die 3 to obtain an aggregate 38 of the short fibers and the powdery resin.

In the step of compressing, the aggregate 38 of the short fibers and the powdery resin is compressed.

More specifically, as illustrated in FIG. 1B, the inside of the cylindrical die 3 is subjected to vacuum suctioning to discharge the dispersion medium via the plurality of drain passages 12 formed in the lower hollow compression mold 2 to fabricate an aggregate 38 of the short fibers and the powdery resin that surrounds the outer peripheral portion of the metal bushing 31.

Using the bushing support member 5 and the slurry diffusion member 7 in this way facilitates positioning and support of the metal bushing 31.

The shape of the outer peripheral surface of the aggregate 38 of the short fibers and the powdery resin is determined by the shape of the inner peripheral surface of the cylindrical die 3.

After the dispersion medium is discharged from the plurality of drain passages 12 formed in the lower hollow compression mold 2, as illustrated in FIG. 6B, the second drive device 19 moves the base 1 from the stand-by position to the ascended position to move the lower hollow compression mold 2 and the cylindrical die 3 toward the upper hollow compression mold 4. In the course of the movement, the distance between the upper hollow compression mold 4 and the lower hollow compression mold 2 gradually becomes shorter. In the course of the movement, the upper elastic member 9 on the depressing member 8 and the lower elastic member 6 under the bushing support member 5 are compressed. The metal bushing 31 is positioned at the center of the aggregate 38 by means of the forces of the upper elastic member 9 and the lower elastic member 6. Springs having an equal spring constant are used as the upper elastic member 9 and the lower elastic member 6.

When the second drive device 19 is driven to further ascend the base 1, the stepped portion 11 of the upper hollow compression mold 4 and the depressing member 8 abut against each other to establish a positional relationship in which the distance between the lower hollow compression mold 2 and the upper hollow compression mold 4 will not be shortened any further, that is, the second positional relationship (see FIG. 6B).

The thickness of the molding material 35 will be described in detail with reference to FIG. 7.

Figure 7A:
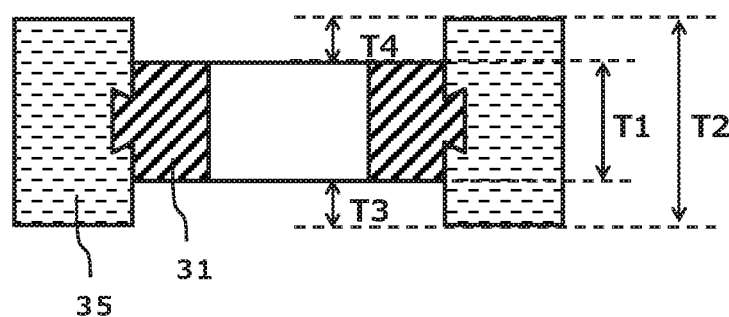
FIG. 7A is a vertical sectional view of a molding material integrated with the bushing.

As illustrated in FIG. 7A, the relationship between the thickness T1 of the metal bushing 31 and the thickness T2 of the molding material 35 (in the compressed state) determined by the stepped portion 11 (see FIG. 1) may be selected as desired from the following three expressions: (A) T1=T2; (B) T1>T2; and (C) T1<T2.

The relationship between the distance T3 from the lower surface of the metal bushing 31 to the lower surface of the molding material 35 in the compressed state and the distance T4 from the upper surface of the metal bushing 31 to the upper surface of the molding material 35 in the compressed state may be selected as desired from the following three expressions: (D) T3=T4; (E) T3>T4; and (F) T3<T4. The selection can be made by changing the respective heights L3 and L4 of the stepped portions 14 and 11 (see FIG. 8B).

Further, the selection from (A) to (C) and the selection from (D) to (F) discussed above may be made in combination.

The duration and the temperature of the compression may be changed as desired according to the type of the short fibers and the powdery resin used. By compressing the molding material 35 while heating by a heater attached to the upper hollow compression mold 4, it is possible to shorten the time required to remove liquid contained in the molding material 35 after filtration and dehydration, and to suppress temporal variations in thickness of the molding material 35 after the compression process.

By performing vacuum suctioning from the drain passages 12 of the lower hollow compression mold 2 during the compression, it is possible to shorten the time required to remove liquid contained in the molding material 35 after the filtration and dehydration processes.

The step of discharging and the step of compressing may be performed at the same time, or the step of compressing may be performed after the step of discharging.

If the steps are sequentially performed, the dispersion medium and the molding material can be sufficiently separated from each other in advance. Thus, the molding material can be compressed without causing the temperature of the upper mold to significantly decrease if the upper mold is heated during compression in the step of compressing. If the steps are performed at the same time, the time for one step can be saved, and the molding material can be manufactured in a shorter time.

<Step of Taking Out>

In the step of taking the molding material out of the molding die, the first drive device 16 and the third drive device 18 slide the cylindrical die 3 downward along the upper hollow compression mold 4 and the lower hollow compression mold 2 with the molding material 35 held between the upper hollow compression mold 4 and the lower hollow compression mold 2 as illustrated in FIGS. 6B and 6C. Then, the second drive device 19 moves the lower hollow compression mold 2 and the cylindrical die 3 downward (to the stand-by position) together with the base 1 until the upper hollow compression mold 4 and the lower hollow compression mold 2 are relatively moved the farthest away from each other (the first positional relationship is established) as illustrated in FIG. 6D. After the slurry diffusion member 7 is removed, the molding material 35 is taken out.

If the cylindrical die 3 is slid along the upper hollow compression mold 4 and the lower hollow compression mold 2 with the molding material 35 held between the upper hollow compression mold 4 and the lower hollow compression mold 2 as in the embodiment, a crack can be prevented from occurring in the molding material 35 which is held between the upper hollow compression mold 4 and the lower hollow compression mold 2 even if the frictional resistance between the cylindrical die 3 and the molding material 35 is large.

The first and second drive devices 16 and 19 may be controlled so as to slightly increase the distance between the upper hollow compression mold 4 and the lower hollow compression mold 2 within such a range that the upper hollow compression mold 4 is not separated from the molding material 35, or so as to weaken a pressing force between the upper hollow compression mold 4 and the lower hollow compression mold 2, before the cylindrical die 3 is slid. This allows frictional resistance between the cylindrical die 3 and the molding material 35 to decrease, thereby advantageously reducing the force required to move the cylindrical die 3.

In the embodiment, pushing down the cylindrical die 3 from above is performed in conjunction with pulling out the cylindrical die 3 in a downward direction to slide the cylindrical die 3. However, the cylindrical die 3 may be slid using only one drive device by bringing one of the first drive device 16 and the third drive device 18 into the driving state and bringing the other into the non-driving state in which the piston of the other drive device is freely movable.

<Step of Forming>

A step of forming a resin molded member will be described below. A resin molded member is formed by applying pressure to the molding material 35 while heating the molding material 35, thereby melting the powdery resin to generate a molten resin; impregnating a reinforcing fiber layer formed from the short fibers with the molten resin; and subsequently curing the molten resin.

Figure 8:
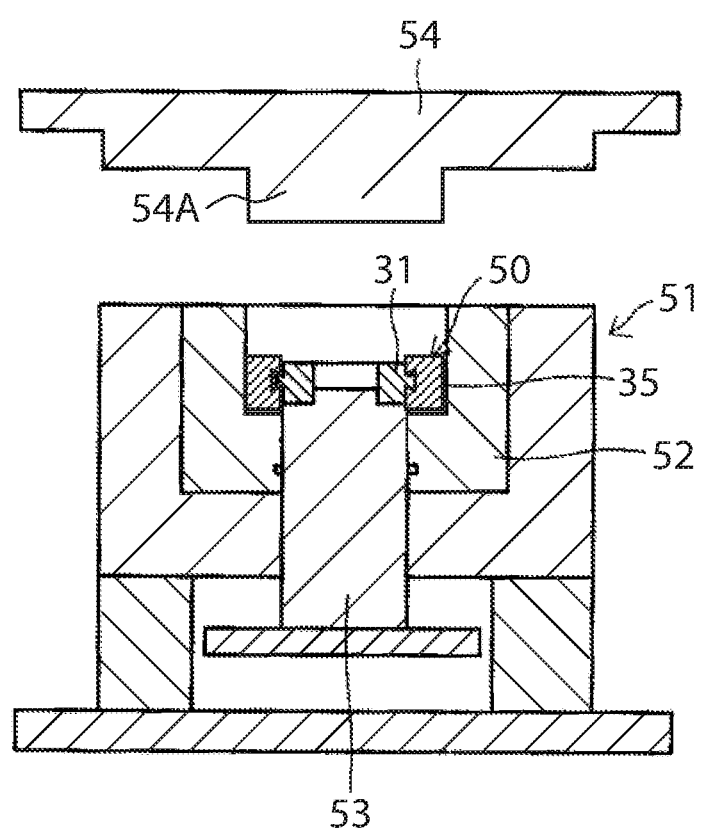
FIG. 8 is a schematic process diagram illustrating fabrication of the resin gear according to the embodiment of the present invention.

As illustrated in FIG. 8, a semifinished product 50 for molding a resin rotator including the molding material 35 provided on the bushing 31 is disposed in a die 51 which has been heated in advance. After that, hot and pressure molding is performed to cure the powdery resin to form a resin rotator including a resin molded member. The die 51 includes a fixed die 52, a movable die 53, and an upper die 54. The movable die 53 is disposed in the center of the fixed die 52 so as to be displaceable in the vertical direction. The upper die 54 is paired with the movable die 53 to hold the bushing 31 between the movable die 53 and the upper die 54. When a pressing portion 54A of the upper die 54 is inserted into the fixed die 52 to press the bushing 31, the movable die 53 is displaced downward according to how far the upper die 54 is inserted into the fixed die 52. After the resin is cured, a resin rotator including a resin molded member, which has been molded using the molding material 35 as a core member, is taken out of the die 51 to complete manufacture of the resin molded member.

<Step of Forming Teeth>

Teeth are formed on the outer peripheral portion of the resin molded member which has been obtained by impregnating with a resin and then curing the resin. The teeth may be provided either during molding or by cutting after the molding. In order to achieve higher accuracy, however, the teeth are preferably provided by cutting.

Second Embodiment

In the first embodiment, slurry is prepared by mixing short fibers, a powdery resin, and water. When such slurry is used, the viscosity of the slurry is low, and therefore the yield is not deteriorated even if the bottom member 39 constituted of two layers of wire meshes, the dutch-woven wire mesh 39A made of stainless steel and the plain-woven wire mesh 39B made of stainless steel demonstrates poor filtration performance. However, if the filtration grain size of the dutch-woven wire mesh 39A is increased in order to improve the drainage and if the grain size of the powdery resin is 10 μm, a large amount of the powdery resin may be discharged together with water because of the poor filtration performance. If the filtration grain size of the dutch-woven wire mesh 39A of the bottom member 39 is reduced in order to prevent such a phenomenon, the dehydration time may be extended although the filtration performance is improved. Thus, in the second embodiment, in order to address such an issue, at least one type of polymer flocculating agent capable of causing flocculation due to electrostatic attraction is added to a mixed solution obtained by mixing the short fibers, the powdery resin, and the dispersion medium. When a polymer flocculating agent capable of causing flocculation due to electrostatic attraction is added, the polymer flocculating agent capable of causing flocculation due to electrostatic attraction not only provides a flocculating function but also works as a fixing agent to fix the short fibers to each other and to fix the short fibers and the powdery resin to each other. As a result, it is possible to increase the amount of the short fibers and the powdery resin remaining in the aggregate. That is, the fixation rate between the short fibers and the powdery resin can be enhanced, thereby increasing the yield.

Any polymer flocculating agent capable of causing flocculation due to electrostatic attraction may be used as long as the fixation rate between the short fibers and the powdery resin can be enhanced and the dehydration performance is not significantly impaired. Examples of a cationic polymer flocculating agent include a styrene-based polymer, a polyamine condensation product, a dicyandiamide condensation product, a cation-modified acrylic-based copolymer, polymethacrylic acid ester series, and a polyamidine hydrochloride. Examples of an anionic polymer flocculating agent include an acrylic-based copolymer, sulfonated polyphenol, a polyphenol-based resin, polyacrylic acid ester series, and a polyacrylic acid sodamide derivative.

In a typical method of causing flocculation using the polymer flocculating agent, the cationic polymer flocculating agent is added and the anionic polymer flocculating agent is subsequently added to the mixed solution. When the cationic polymer flocculating agent is added to the mixed solution, a part of the short fibers and a part of the powdery resin are gathered to form a large number of aggregates called "flocks". When the anionic polymer flocculating agent is subsequently added, the flocks are aggregated to generate larger flocks, thereby forming a large number of large flocks. If such flocks are formed, the dehydration performance is improved. As a result, dehydration can be completed in a short time, and the fixation rate between the short fibers and the powdery resin is improved. In particular, high dehydration performance can be achieved by using a cationic styrene-based polymer aqueous solution as the cationic polymer flocculating agent and using an anionic acrylic-based polymer aqueous solution as the anionic polymer flocculating agent.

Alternatively, an amphoteric polymer flocculating agent can be used as the polymer flocculating agent. The amphoteric polymer flocculating agent achieves the effect (cations) of neutralizing the short fibers and the powdery resin in the mixed solution, generates entanglement (polymers) due to polymer chains, and achieves the effect of reinforcing the entanglement (polymers) through electrostatic attraction due to electric charges of anions and cations. Examples of the amphoteric polymer flocculating agent include an acrylamide/acrylic acid/alkylaminoacrylate quaternary salt copolymer, polyacrylic acid ester series, and polymethacrylic acid ester series.

EXAMPLES

Examples according to the present invention will be described below.

Example 1

In order to prepare slurry, a tank filled with water was prepared in such an amount that the concentration of short fibers and a powdery resin poured would be 4 g/liter. Then, short fibers and a powdery resin were poured into the tank in such an amount that the total amount of the short fibers in the resin molded member would be 40% by volume and in such an amount that the total amount of the powdery resin in the resin molded member would be 60% by volume. Specifically, 50% by mass of para-aramid fibers "Technora (trademark)" manufactured by Teijin Ltd and having an aspect ratio of 200, 45% by mass of meta-aramid fibers "Teijinconex (trademark)" manufactured by Teijin Ltd and having an aspect ratio of 200, and 5% by mass of fine fibers "Kevlar (trademark)" manufactured by DuPont and fibrillated to a freeness value of 300 ml were poured as a fiber chop used as the short fibers. Phenol resin powder "Bellpearl (trademark)" manufactured by Air Water Bellpearl Inc. and having a grain size of 20 μm was poured as the powdery resin. Next, water in the tank was stirred by a stirrer to disperse the fiber chop and the phenol resin powder to manufacture slurry.

At this point, a cationic styrene-based polymer aqueous solution commercially available from Meisei Chemical Works, Ltd. under the name of "Cerafix ST" (trademark) was added as the cationic polymer flocculating agent and then stirred. After that, an anionic acrylic-based polymer aqueous solution commercially available from Meisei Chemical Works, Ltd. under the name of "Filex M" (trademark) was subsequently added as the anionic polymer flocculating agent and then stirred. Thus, the slurry to be used in the embodiment was obtained. The amount of the cationic styrene-based polymer aqueous solution to be added was 0.2% by mass with respect to the total amount of the short fibers and the powdery resin. The amount of the anionic acrylic-based polymer aqueous solution to be added was 0.1% by mass with respect to the total amount of the short fibers and the powdery resin.

Next, the filtration-dehydration-compression device illustrated in FIG. 1A was used to position the metal bushing 31 on the bushing support member 5, and to place the slurry diffusion member 7 on the metal bushing 31 so as not to be displaced. Thus, the metal bushing 31 is sandwiched between the bushing support member 5 and the slurry diffusion member 7. The center angle of the conical surface of the slurry diffusion portion 71, which has a conical shape that projects upward, of the slurry diffusion member 7 is 90°. The apex of the slurry diffusion portion 71 has a curved surface with a radius of 15 mm.

The projecting portions 33 and the recessed portions 34 of the metal bushing 31 used (see FIG. 3) had h1 and h2 values of 2 mm and 0.5 mm, respectively. The projecting portions 33 had an undercut shape. The angle θ between an imaginary center transverse sectional surface and a side surface of the metal bushing 31 was 20°.

The lower hollow compression mold 2 was located such that the distance from the center of the metal bushing 31 in the axial direction to the upper surface of the bottom member 39 was 50 mm.

The slurry described above was poured into the filtration-dehydration-compression device with the slurry injection upper mold 20 illustrated in FIG. 1B and the cylindrical die 3 tightly contacting each other. Then, the inside of the cylindrical die 3 was subjected to vacuum suctioning to discharge water via the plurality of drain passages 12 formed in the lower hollow compression mold 2 so that the fiber chop and the phenol resin powder, and the water were separated to obtain a cylindrical aggregate 38 of the short fibers and the powdery resin. After the fiber chop and the phenol resin powder, and the water were separated from each other by the vacuum suctioning, water was poured via the slurry injection hole 21 to wash away the fiber chop and the phenol resin powder remaining on the upper side of the slurry diffusion member 7. The slurry injection hole 21 was disposed directly above the slurry diffusion member 7.

In order to prevent an outflow of the fiber chop and the phenol resin powder via the drain passages 12 during the discharging of the water, the bottom member 39 was disposed on the lower hollow compression mold 2. A member obtained by coupling the dutch-woven wire mesh 39A and the plain-woven wire mesh 39B by sintering was used as the bottom member 39. Specifically, the dutch-woven wire mesh 39A made of stainless steel with a mesh size of 12 mesh vertically and 64 mesh horizontally and with a filtration grain size of 310 μm and the plain-woven wire mesh 39B with a mesh size of 50 mesh and with an opening rate of 40% were used as the bottom member 39. The term "mesh" is defined as a unit that indicates the fineness of a wire mesh and that indicates the number of mesh openings per inch. A metal plate having a thickness of 1.5 mm and perforated with holes having a diameter of 3 mm and disposed in a staggered arrangement at 4 mm pitches was used as the support plate 40. The bottom member 39 was disposed on the support plate 40 with the dutch-woven wire mesh 39A located on the plain-woven wire mesh 39B.

Next, the aggregate 38 was compressed so that the fiber chop and the phenol resin powder were furthermore deeply engaged with the detent portions of the metal bushing 31. As illustrated in FIG. 6A, the upper hollow compression mold 4 was pushed down to a position at which the distance from the center of the metal bushing 31 in the axial direction to the lower surface of the upper hollow compression mold 4 was 50 mm. At the position of FIG. 6A, the metal bushing 31 is located at the middle between the upper hollow compression mold 4 and the lower hollow compression mold 2.

As illustrated in FIG. 6B, the upper hollow compression mold 4 was descended or lowered at a speed of 1 to 5 mm/s with the bushing 31 located at the middle between the upper hollow compression mold 4 and the lower hollow compression mold 2 until the thickness of the aggregate 38 of the short fibers and the powdery resin was compressed to 20 mm.

Then, the aggregate 38 was compressed in this state for two minutes to obtain a semifinished product for molding a resin rotator integrated with the metal bushing 31.

Figure 7B:
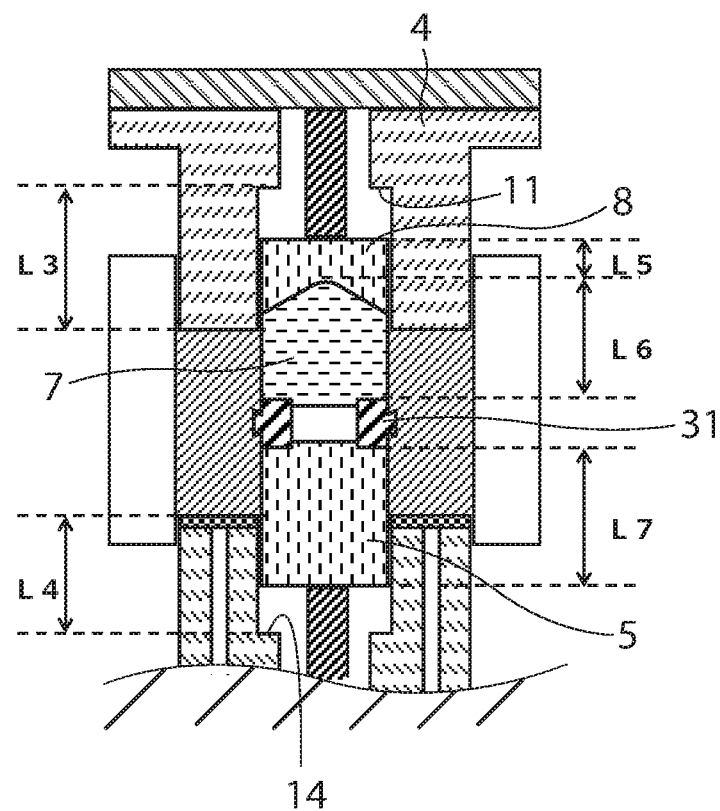
FIG. 7B is a vertical sectional view of the filtration-dehydration-compression device.

During the compression, vacuum suctioning was performed via the drain passages 12 in the lower hollow compression mold 2. In addition, as illustrated in FIG. 7B, the length L7 of the bushing support member 7 was 100 mm, the length L6 of the slurry diffusion member 7 was 70 mm, the length L5 of the depressing member 8 was 30 mm, the thickness T1 of the metal bushing 31 was 10 mm, and the respective heights L3 and L4 of the stepped portions of the upper hollow compression mold 4 and the lower hollow compression mold 2 were both 100 mm.

Example 2

A molding material was fabricated by the same method as in Example 1 except that the support plate 40 had a thickness of 3 mm.

Comparative Example 1

Only a dutch-woven wire mesh was used as the bottom member. A molding material was fabricated by a method that was otherwise the same as in Example 1.

Comparative Example 2

Only a plain-woven wire mesh was used as the bottom member. A support plate was not used. A molding material was fabricated by a method that was otherwise the same as in Example 1.

Comparative Example 3

A stack of a dutch-woven wire mesh and a plain-woven wire mesh which were not subjected to sintering was used as the bottom member. A molding material was fabricated by a method that was otherwise the same as in Example 1.

Comparative Example 4

A stack of two dutch-woven wire meshes which were not subjected to sintering was used as the bottom member. A support plate was not used. A molding material was fabricated by a method that was otherwise the same as in Example 1.

Comparative Example 5

A stack of two plain-woven wire meshes which were not subjected to sintering was used as the bottom member. A support plate was not used. A molding material was fabricated by a method that was otherwise the same as in Example 1.

Comparative Example 6

A stack of two dutch-woven wire meshes which were subjected to sintering was used as the bottom member. A support plate was not used. A molding material was fabricated by a method that was otherwise the same as in Example 1.

The test results for Examples 1 and 2 and Comparative Examples 1 to 6 are shown in the following table.

TABLE 1

| Item | Com. Ex. 1 | Com. Ex. 2 | Com. Ex. 3 | Com. Ex. 4 | Com. Ex. 5 |
|---|---|---|---|---|---|
| Bottom member configuration | | | | | |
| No. of Dutch-woven wire meshes | 1 | — | 1 | 2 | — |
| No. of Plain-woven wire meshes | — | 1 | 1 | — | 2 |
| Whether or not sintered | No | No | No | No | No |
| Perforated metal plate | Yes | No | Yes | No | No |
| Whether or not cracked | No | No | No | No | No |
| No. of times of continuous use | 50 | 1 | 50 | 50 | 1 |
| Drain time (second) | 20-50 | 15-20 | 20-25 | 60-65 | 15-20 |

TABLE 1-continued

| Item | Com. Ex. 6 | Ex. 1 | Ex. 2 |
|---|---|---|---|
| Bottom member configuration | | | |
| No. of Dutch-woven wire meshes | 2 | 1 | 1 |
| No. of Plain-woven wire meshes | — | 1 | 1 |
| Whether or not sintered | Yes | Yes | Yes |
| Perforated metal plate | No | Yes (thickness: 1.5 mm) | Yes (thickness: 3 mm) |
| Whether or not cracked | No | No | No |
| No. of times of continuous use | 4500 or more | 1000 | 4500 or more |
| Drain time (second) | 60-65 | 20-25 | 20-25 |

As is clearly known from Comparative Examples 1 to 5, the bottom member cannot be continuously used more than 50 times if a support plate is not used. Even if a support plate is not used, using two dutch-woven wire meshes subjected to sintering as in Comparative Example 6 can drastically increase the number of times of continuous use, but requires a long drainage time. In contrast, using a support plate, and a dutch-woven wire mesh and a plain-woven wire mesh coupled to each other by sintering like the bottom member in Examples 1 and 2 can significantly increase the number of times of continuous use, and shorten the filtration time.

The molding material was not cracked in all the examples and the comparative examples.

INDUSTRIAL APPLICABILITY

If the cylindrical die is slid along the upper compression mold and the lower compression mold with the molding material held between the upper compression mold and the lower compression mold as in the present invention, a crack is prevented from occurring in the molding material which is held between the upper compression mold and the lower compression mold even if the frictional resistance is large. Thus is provided herein a method of manufacturing a molding material that can prevent a crack from occurring in the molding material.

In the resin gear manufactured by the method according to the present invention, the weight of the molding material is uniform. Thus, the resin gear has uniform strength and high durability, and can be used as a resin gear that can endure high-temperature and high-load use conditions for vehicle components, industrial components, and so forth.

DESCRIPTION OF REFERENCE NUMERALS 1 base
2 lower hollow compression mold
3 cylindrical die
4 upper hollow compression mold
5 bushing support member
6 lower elastic member
7 slurry diffusion member
8 depressing member
9 upper elastic member
11 stepped portion
14 stepped portion
12 drain passage
13 filtration-dehydration-compression device
20 slurry injection upper mold
21 slurry injection hole
30 resin gear
31 metal bushing
32 through hole
33 projecting portion
34 recessed portion
35 molding material
36 outer peripheral portion
37 resin molded member
38 aggregate of short fibers and powdery resin
39 bottom member
39A dutch-woven wire mesh
39B plain-woven wire mesh
40 support plate
41 through hole
50 semifinished product for molding a resin rotator
51 die
52 fixed die
53 movable die
54 upper die
54A pressing portion

The invention claimed is:

1. A method of manufacturing a molding material, comprising the steps of:
preparing a mold device including:
a molding die including at least a cylindrical die having an opening portion opened in an upward direction, and a lower compression mold and an upper compression mold, both of which are disposed inside the cylindrical die during molding;
preparing slurry by dispersing short fibers and a powdery resin in a dispersion medium;
pouring the slurry into the cylindrical die with the upper compression mold placed at a stand-by position;
discharging the dispersion medium from the molding die to aggregate the short fibers and the powdery resin in the molding die to form an aggregate;
compressing the aggregate by relatively moving the upper compression mold and the lower compression mold closer to each other inside the cylindrical die to form a molding material, during or after the step of discharging; and
taking out the molding material from the molding die, wherein the cylindrical die is slid along the upper compression mold and the lower compression mold with the molding material held between the upper and lower compression molds and then the upper and lower compression molds are relatively moved away from each other to take out the molding material.

2. The method of manufacturing a molding material according to claim 1, wherein:
the molding die includes a slurry diffusion member disposed at the center of the cylindrical die to extend in the upward direction and including a slurry diffusion portion shaped such that the area of a transverse section taken along a direction orthogonal to the upward direction becomes smaller in the upward direction;
in the step of pouring, the slurry is poured toward the slurry diffusion member from the upward direction; and
the method further comprises the step of cleaning the slurry diffusion member by pouring a dispersion medium that is the same as the dispersion medium used in the step of preparing the slurry or water onto the slurry diffusion member from above the slurry diffusion member to cause the short fibers and the powdery resin adhering to the slurry diffusion member to fall down, after the step of pouring the slurry.

3. The method of manufacturing a molding material according to claim 2, wherein:
in the step of pouring and the step of cleaning, the opening portion of the cylindrical die is blocked by a lid member including a nozzle provided at the center to extend downward; and
the length of the nozzle and the shape of a leading end of the nozzle are determined such that the dispersion medium or the water is intensively poured onto the slurry diffusion member in the step of cleaning.

4. The method of manufacturing a molding material according to claim 1, wherein
the distance between the upper compression mold and the lower compression mold is slightly increased within such a range that the upper compression mold is not separated from the molding material before the cylindrical die is slid.

5. The method of manufacturing a molding material according to claim 1, wherein
a pressing force between the upper compression mold and the lower compression mold is weakened before the cylindrical die is slid.

6. The method of manufacturing a molding material according to claim 1, wherein
in the step of taking out, the cylindrical die is slid by pushing down the cylindrical die from the upward direction in conjunction with pulling out the cylindrical die in a downward direction.

7. A method of manufacturing a molding material, comprising the steps of:
preparing a mold device including:
a molding die including at least a cylindrical die having an opening portion opened in an upward direction, and a lower compression mold and an upper compression mold, both of which are disposed inside the cylindrical die during molding;
preparing slurry by dispersing short fibers in a dispersion medium;
pouring the slurry into the cylindrical die with the upper compression mold placed at a stand-by position;
discharging the dispersion medium from the molding die to aggregate the short fibers in the molding die to form an aggregate;
compressing the aggregate by relatively moving the upper compression mold and the lower compression mold closer to each other inside the cylindrical die to form a molding material, during or after the step of discharging; and taking out the molding material from the molding die, wherein the cylindrical die is slid along the upper compression mold and the lower compression mold with the molding material held between the upper and lower compression molds and then the upper and lower compression molds are relatively moved away from each other to take out the molding material.

8. An apparatus of manufacturing a molding material comprising:

a molding die including at least a cylindrical die having an opening portion opened in an upward direction, and a lower compression mold and an upper compression mold, both of which are disposed inside the cylindrical die during molding;

a first drive device configured to displace the cylindrical die between a molding position at which the lower compression mold is located inside the cylindrical die and a take-out position at which a molding material can be exposed from the cylindrical die;

a second drive device configured to displace at least one of the lower compression mold and the upper compression mold to establish a first positional relationship in which the distance between the lower compression mold and the upper compression mold is maximized, and to establish a second positional relationship in which the distance between the lower compression mold and the upper compression mold is minimized; and a sequence control device configured to perform sequence control on the first drive device and the second drive device, wherein:

the sequence control device performs sequences of:
controlling the first drive device so as to hold the cylindrical die at the molding position and controlling the second drive device so as to establish the first positional relationship when slurry obtained by dispersing short fibers and a powdery resin in a dispersion medium is poured into the cylindrical die;
controlling the second drive device so as to establish the second positional relationship when or after an aggregate is formed by discharging the dispersion medium from the molding die to aggregate the short fibers and the powdery resin in the molding die, in order to compress the aggregate to form a molding material;
controlling the first drive device so as to displace the cylindrical die to the take-out position after the second positional relationship is established; and
controlling the second drive device so as to establish the first positional relationship after the first drive device displaces the cylindrical die to the take-out position.

9. The apparatus of manufacturing a molding material according to claim 8, wherein the sequences are performed to increase the distance between the upper compression mold and the lower compression mold, which have been disposed in the second positional relationship, within such a range that the upper compression mold and the lower compression mold are not separated from the molding material before the cylindrical die is displaced from the molding position to the take-out position.

10. The apparatus of manufacturing a molding material according to claim 8, wherein the first drive device is configured to slide the cylindrical die by pushing down the cylindrical die from the upward direction in conjunction with pulling out the cylindrical die in a downward direction when displacing the cylindrical die from the molding position to the take-out position.

11. An apparatus of manufacturing a molding material comprising:

a molding die including at least a cylindrical die having an opening portion, and a lower compression mold and an upper compression mold, both of which are disposed inside the cylindrical die during molding;

a first drive device configured to displace the cylindrical die between a molding position at which the lower compression mold is located inside the cylindrical die, and a take-out position at which a molding material can be exposed from the cylindrical die;

a second drive device configured to displace at least one of the lower compression mold and the upper compression mold to establish a first positional relationship in which the distance between the lower compression mold and the upper compression mold is maximized, and to establish a second positional relationship in which the distance between the lower compression mold and the upper compression mold is minimized; and a sequence control device configured to perform sequence control on the first drive device and the second drive device, wherein:

the sequence control device performs sequences of:
controlling the first drive device so as to hold the cylindrical die at the molding position and controlling the second drive device so as to establish the first positional relationship when slurry obtained by dispersing short fibers in a dispersion medium is poured into the cylindrical die;
controlling the second drive device so as to establish the second positional relationship when or after an aggregate is formed by discharging the dispersion medium from the molding die to aggregate the short fibers in the molding die, in order to compress the aggregate to form a molding material;
controlling the first drive device so as to displace the cylindrical die to the take-out position after the second positional relationship is established; and
controlling the second drive device so as to establish the first positional relationship after the first drive device displaces the cylindrical die to the take-out position.

12. A method of manufacturing a resin gear, comprising:
forming a resin rotator by the method of claim 1 by applying pressure and heat to the aggregate melting the powdery resin to generate a molten resin to form the molding material;
impregnating a reinforcing fiber layer formed from the short fibers with the molten resin,
curing the molten resin to form a resin molded member for the resin rotator; and
forming teeth on an outer peripheral portion of the resin molded member to form a resin gear.

* * * * *